United States Patent
Leiteritz et al.

(10) Patent No.: US 12,403,541 B2
(45) Date of Patent: Sep. 2, 2025

(54) PORTABLE ADVANCED PROCESS MODULE

(71) Applicant: Illinois Tool Works Inc., Glenview, IL (US)

(72) Inventors: Nathan G. Leiteritz, Greenville, WI (US); Joseph C. Schneider, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/981,527

(22) Filed: Nov. 7, 2022

(65) Prior Publication Data

US 2023/0311229 A1    Oct. 5, 2023

Related U.S. Application Data

(63) Continuation of application No. 15/238,971, filed on Aug. 17, 2016, now Pat. No. 11,491,573.
(Continued)

(51) Int. Cl.
*B23K 9/10* (2006.01)
*B23K 9/028* (2006.01)
(Continued)

(52) U.S. Cl.
CPC .......... *B23K 9/1006* (2013.01); *B23K 9/0282* (2013.01); *B23K 9/1087* (2013.01);
(Continued)

(58) Field of Classification Search
CPC .... B23K 2201/06; B23K 37/00; B23K 37/02; B23K 9/0282; B23K 9/1006; B23K 9/1087; B23K 9/124; B23K 9/133; B23K 9/173
(Continued)

(56) References Cited

U.S. PATENT DOCUMENTS 3,562,487 A    2/1971  Nelson
4,034,184 A    7/1977  Fernicola
(Continued)

FOREIGN PATENT DOCUMENTS

CN    1255418    6/2000
CN    2684986    3/2005
(Continued)

OTHER PUBLICATIONS

Written Opinion and International Search Report in PCT/US2013/044236 dated Oct. 21, 2013 (9 pages).
(Continued)

*Primary Examiner* — Sang Y Paik
(74) *Attorney, Agent, or Firm* — McAndrews, Held & Malloy, Ltd.

(57) ABSTRACT

A portable advanced process module system includes, for example, a welding power source, an portable advanced process module, and a wire feeder. The portable advanced process module and the wire feeder are separately enclosed in suitcase style enclosures with disconnectable power and communication means between the portable advanced process module and the wire feeder. The processing unit includes power electronics to enable advanced weld processes that can be delivered to the wire feeder and a welding work piece. The portable advanced process module is powered by a DC bus that can be supplied by a welding power source. Connecting the portable advanced process module between the welding power source and the wire feeder enables advanced welding processes to be accomplished at great distances from the main welding power source. Separating the power electronics into the portable advanced process module and maintaining a standard suitcase wire feeder form factor keeps the welding equipment used in the working area envelope small, light, and portable.

19 Claims, 3 Drawing Sheets

Related U.S. Application Data

(60) Provisional application No. 62/206,103, filed on Aug. 17, 2015.

(51) Int. Cl.
| | | |
|---|---|---|
| *B23K 9/12* | (2006.01) | |
| *B23K 9/133* | (2006.01) | |
| *B23K 9/173* | (2006.01) | |
| *B23K 37/00* | (2006.01) | |
| *B23K 37/02* | (2006.01) | |
| *B23K 101/06* | (2006.01) | |

(52) U.S. Cl.
CPC .............. *B23K 9/124* (2013.01); *B23K 9/133* (2013.01); *B23K 9/173* (2013.01); *B23K 37/00* (2013.01); *B23K 37/02* (2013.01); *B23K 2101/06* (2018.08)

(58) Field of Classification Search
USPC ........................................................ 219/137
See application file for complete search history.

(56) References Cited

U.S. PATENT DOCUMENTS

| | | | |
|---|---|---|---|
| 4,246,463 A | 1/1981 | Shutt | |
| 4,464,558 A | 8/1984 | Mizuno | |
| 4,584,458 A | 4/1986 | Tremblay | |
| 4,769,754 A | 9/1988 | Reynolds | |
| 4,818,313 A | 4/1989 | Sundberg | |
| 4,963,715 A | 10/1990 | Tuttle | |
| 4,964,029 A | 10/1990 | Severinsky | |
| 5,025,127 A | 6/1991 | Gilliland | |
| 5,235,504 A | 8/1993 | Sood | |
| 5,278,390 A | 1/1994 | Blankenship | |
| 5,852,278 A | 12/1998 | Tanaka | |
| 5,991,169 A | 11/1999 | Kooken | |
| 6,023,037 A | 2/2000 | Church | |
| 6,207,929 B1 | 3/2001 | Stava | |
| 6,504,132 B1 | 1/2003 | Church | |
| 6,515,259 B1 | 2/2003 | Hsu | |
| 6,552,303 B1 | 4/2003 | Blankenship | |
| 6,982,398 B2 | 1/2006 | Albrecht | |
| 7,064,290 B2 | 6/2006 | Blankenship | |
| 7,072,774 B1 | 7/2006 | Houston | |
| 7,091,445 B2 | 8/2006 | Myers | |
| 7,183,517 B2 | 2/2007 | Albrecht | |
| 7,782,032 B2 | 8/2010 | Taufik | |
| 7,838,797 B2 | 11/2010 | Albrecht | |
| 7,842,903 B2 | 11/2010 | Myers | |
| 8,080,761 B2 | 12/2011 | Matthews | |
| 8,264,188 B2 | 9/2012 | Veik | |
| 8,395,085 B2 | 3/2013 | Schartner | |
| 8,405,001 B2 | 3/2013 | Albrecht | |
| 8,735,775 B2 | 5/2014 | Kaufman | |
| 8,841,583 B2 | 9/2014 | Albrecht | |
| 11,491,573 B2 * | 11/2022 | Leiteritz | B23K 9/133 |
| 2003/0136774 A1 | 7/2003 | Nikodym | |
| 2004/0089645 A1 | 5/2004 | Saccon | |
| 2004/0222203 A1 | 11/2004 | Holverson | |
| 2004/0245230 A1 | 12/2004 | Huismann | |
| 2005/0051524 A1 | 3/2005 | Blankenship | |
| 2005/0061791 A1 | 3/2005 | Matus | |
| 2005/0199605 A1 | 9/2005 | Furman | |
| 2006/0037953 A1 | 2/2006 | Matthews | |
| 2006/0171090 A1 | 8/2006 | Enyedy | |
| 2007/0080154 A1 | 4/2007 | Ott | |
| 2007/0158324 A1 | 7/2007 | Odonnell | |
| 2007/0181547 A1 | 8/2007 | Vogel | |
| 2007/0181553 A1 | 8/2007 | Stanzel | |
| 2007/0187376 A1 | 8/2007 | Albrecht | |
| 2009/0201704 A1 | 8/2009 | Sickels | |
| 2010/0155384 A1 | 6/2010 | Albrecht | |
| 2010/0170880 A1 | 7/2010 | Hsu | |
| 2010/0187210 A1 | 7/2010 | Albrecht | |
| 2010/0320183 A1 * | 12/2010 | Borchert | B23K 9/12 219/130.1 |
| 2011/0049116 A1 | 3/2011 | Rappl | |
| 2011/0196915 A1 | 8/2011 | Kim | |
| 2011/0204034 A1 | 8/2011 | Schartner | |
| 2011/0220620 A1 | 9/2011 | Vogel | |
| 2011/0309054 A1 | 12/2011 | Salsich | |
| 2011/0309062 A1 | 12/2011 | Odonnell | |
| 2012/0097644 A1 | 4/2012 | Ott | |
| 2012/0241417 A1 * | 9/2012 | Mehn | B23K 9/0956 219/108 |
| 2013/0114306 A1 | 5/2013 | Kooken | |
| 2013/0327752 A1 | 12/2013 | Salsich | |
| 2014/0051358 A1 * | 2/2014 | Dina | B23K 9/322 455/41.2 |
| 2014/0097164 A1 | 4/2014 | Beistle | |
| 2015/0048072 A1 | 2/2015 | Borchert | |

FOREIGN PATENT DOCUMENTS

| | | |
|---|---|---|
| CN | 1633345 | 6/2005 |
| CN | 1765556 | 5/2006 |
| CN | 101360580 | 2/2009 |
| CN | 101370610 | 2/2009 |
| CN | 101374627 | 2/2009 |
| CN | 101856763 | 10/2010 |
| CN | 102448653 | 5/2012 |
| DE | 102007008598 | 8/2008 |
| EP | 1586403 | 10/2005 |
| EP | 2345500 | 7/2011 |
| JP | 2003191075 | 7/2003 |
| JP | 2004223555 A | 8/2004 |

OTHER PUBLICATIONS

Written Opinion and International Search Report in PCT/US2013/044596 dated Oct. 17, 2013 (8 pages).
Written Opinion and International Search Report in PCT/US2013/044284 dated Feb. 17, 2014 (8 pages).
Written Opinion and International Search Report in PCT/US2013/044597 dated Apr. 10, 2014 (12 pages).
Written Opinion and International Search Report in PCT/US2014/053023 dated Feb. 5, 2015 (11 pages).
PCT, Notification of Transmittal of the International Search Report and the Written Opinion of the International Searching Authority, or the Declaration, in application No. PCT/US2016/047250, dated Nov. 25, 2016 (11 pages).
PCT, Notification Concerning Transmittal of International Preliminary Rport on Patentability, in application No. PCT/U2016/047250, dated Mar. 1, 2018 (6 pages).

* cited by examiner

PORTABLE ADVANCED PROCESS MODULE

RELATED APPLICATIONS

The present application is a continuation of U.S. application Ser. No. 15/238,971, filed Aug. 8, 2016, and claims priority to and benefit from U.S. Application No. 62/206,103, filed Aug. 17, 2015. The above-identified applications are hereby incorporated by reference herein in their entirety.

BACKGROUND

A typical working environment in a shipyard can consist of rack-mounted or individually mounted welding power sources located remotely from the actual welding area. These power sources can be as far away as 200 feet or more from the welding area. The typical working weld area for a welding operator generally encompasses a 75-foot working area envelope in which the welding wire feeder and welding torch are moved around a generally stationary work piece (e.g., a section of the ship). Such work areas present challenges such as, for example, navigating through portholes, small access corridors, and other openings.

What is needed is welding equipment that is capable of easy passage through such openings. Additionally, the welding equipment is frequently moved around the working envelope, so smaller and lighter welding equipment is desired to reduce operator fatigue.

BRIEF SUMMARY

Methods and systems are provided for a portable advanced process module system, substantially as illustrated by and/or described in connection with at least one of the figures, as set forth more completely in the claims.

DETAILED DESCRIPTION

As utilized herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Some embodiments according to the present disclosure provide for systems and methods that provide portable process modules. In some embodiments, the portable process module systems include a portable advanced process module that provides advanced welding processes including, for example, any weld process that involves the rapid manipulation of a welding current, a voltage, and/or a wire feed speed (WFS) including changing polarity, for example, to achieve desired welding arc characteristics. Examples include, but are not limited to pulse welding such as, for example, Accu-Pulse, Versa-Pulse, regulated metal deposition (RMD), etc. and alternating current (AC) welding. Applications can include, for example, in an environment in which reduced size, reduced weight, and/or increased portability of the welding equipment such as in, for example, a shipyard, a construction site, etc. is advantageous. Advanced welding processes can be useful, for example, when welding high strength, low allow (HSLA) steel.

Figure 1:
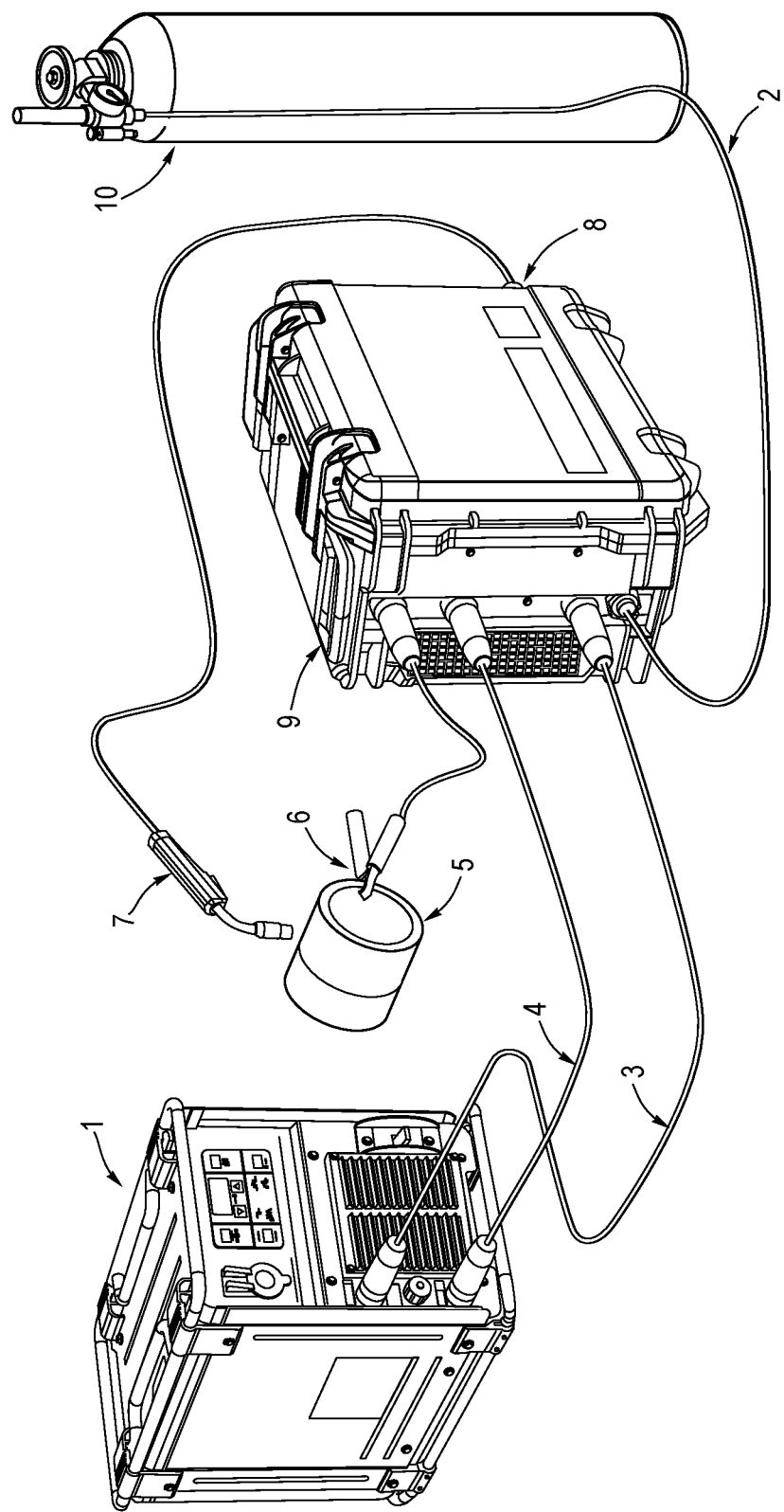
FIG. 1 shows an embodiment of an all-in-one feeder and power source system according to the present disclosure.

FIG. 1 shows an embodiment of an all-in-one feeder and power source system according to the present disclosure. Referring to FIG. 1, a remote or main welding power source 1 (e.g., PipeWorx FieldPro power source) is connected to an all-in-one feeder and power source 9 (e.g., PipeWorx FieldPro with SmartFeeder) through positive and negative cables 3, 4. A shield gas source 10 is connected to the all-in-one feeder and power source 9 via a shield gas hose 2. A welding torch or gun 7 is connected to the all-in-one feeder and power source 9 through the welding torch/gun cable 8. A work piece 5 is connected to the all-in-one feeder and power source 9 via a work lead 6.

The all-in-one feeder and power source 9 is configured to effectively run off a DC bus supplied by the remote or main welding power source 1. The feeder of the remote or main welding power source 1 is designed to accept, for example, a 12-inch wire spool. The remote or main welding power source 1 is configured to be contained within a single suitcase-style enclosure. The combination of the all these systems in one enclosure leads to a significantly larger and heavier product which might not be ideal, especially in a shipyard environment, for example. Some embodiments of the present disclosure provide for a reduction in size, a reduction in weight, and/or an increase in portability with respect to the all-in-one feeder and power source 9.

Figure 2:
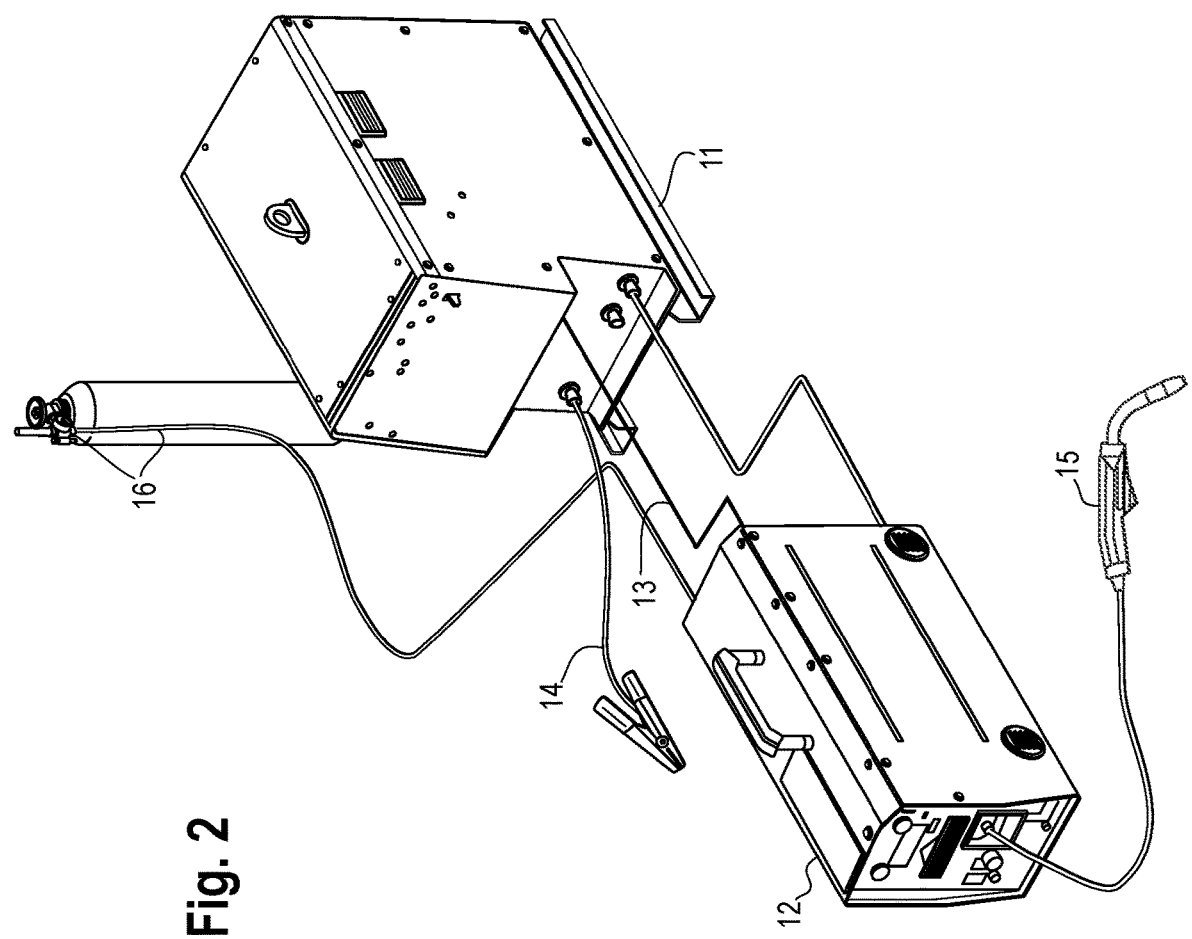
FIG. 2 shows another embodiment of a welding system according to the present disclosure.

FIG. 2 shows another embodiment of a welding system according to the present disclosure. The welding system includes a power source 11 that has the processing power for controlling the welding process through a digital control cable 13 that is connected to a feeder 12. The feeder 12 is connected to a MIG gun 15. A weld power clamp 14 is connected to a work piece (not shown). A gas hose 16 connects a gas source and the feeder 12.

The digital control cable 13 enables the power source 11 to control the feeder 12 to provide welding processes and to coordinate the feeder 2 and the power source 11. The distance between the power source 11 and the feeder 12 can be greater than 200 feet. Some embodiments of the present disclosure provide for the elimination of the digital control cable 13 which can be greater than 200 feet, for example, which due to its length and inductance, can reduce the reliability and increase the complexity of the welding process and/or the control of the welding process.

Figure 3:
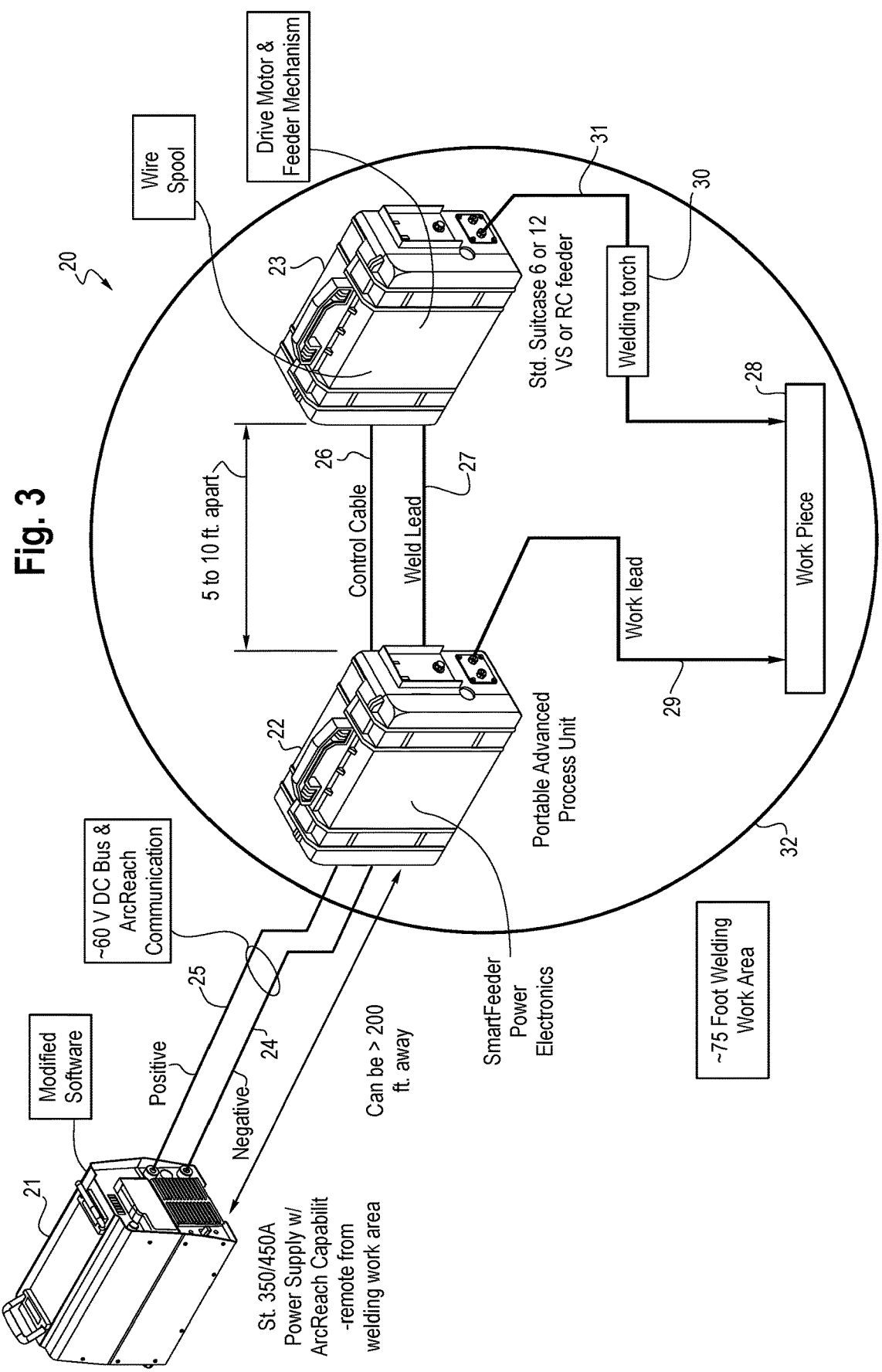
FIG. 3 shows an embodiment of a portable advanced process module system according to the present disclosure.

FIG. 3 shows an embodiment of a portable advanced process module system according to the present disclosure. The portable advanced process module system 20 can include, for example, a welding power supply 21 (e.g., main welding power supply or power source, remote welding power supply or power source, etc.), a portable advanced process module 22 (e.g., a portable advanced process unit, an advanced process unit, etc.), and a feeder 23. The welding power supply 21 is coupled to portable advanced process module 22 through the positive and negative leads 24, 25. The portable advanced process module 22 is coupled to the feeder 23 through a control cable 26 and a weld lead 27. The portable advanced process module 22 is also coupled to a work piece 28 through a work lead 29. The feeder 23 is coupled to a welding torch or gun through a welding cable 31. In some embodiments, the negative lead 24 is connected to the work piece 28 instead of directly to the portable advanced process module 22.

In some embodiments, the welding power supply 21 is a 350/450 Amp power supply that provides system communication over the welding cables without an external communication cable (e.g., ArcReach capabilities), thereby enabling point-of-use control of some or all of the welding system, and can be located remotely from the welding work area 32. The welding power supply 21 can also be a standard welding power supply so that a customer can use its standard fleet of welding power supplies, for example. In some cases, the welding work area 32 can be greater than approximately 200 feet away from the welding power supply 21. However, the present disclosure contemplates that the distance between welding work area 32 and the welding power supply 21 can vary. In some cases, for example, the welding work area 32 can be between approximately 150 feet and 250 feet away, and, in yet other cases, for example, the welding work area 32 can be between approximately 50 feet and 300 feet away. The ArcReach capability uses the positive and/or negative leads 24, 25 to communicate welding control information between the portable advanced process module 22 and the welding power supply 21. Control is effectively localized in the welding work area instead of the remote location of the welding power supply 21. The negative and/or positive leads 24, 25 provide, for example, a 60-Volt direct current (DC) bus which can power the portable advanced process module 22 which, in turn, can power the feeder 23.

In some embodiments, the welding work area 32 has an approximately 75 foot-radius. However, the present disclosure contemplates that the radius of the welding work area 32 can vary. The distance between the portable advanced process module 22 and the feeder 23 in the welding work area 32 can be, for example, approximately 5 to 10 feet. Of course, other distances (e.g., less than 5 feet, less than 10 feet, less than 15 feet, etc.) are also contemplated by the present disclosure.

In some embodiments, the portable advanced process module 22 can be in a suitcase enclosure (e.g., a standard suitcase size similar to a suitcase sized for holding an 8- or 12-inch spool, or an even smaller suitcase size). The suitcase enclosure of the portable advanced process module 22 can house, for example, power electronics (e.g., feeder power electronics, SmartFeeder power electronics, etc.). The enclosed power electronics enable advanced weld processes that can be delivered to the feeder 23 (e.g., wire feeder) and the work piece 28 (e.g., welding work piece). The portable advanced process module 22 provides power electronics that provide advanced welding waveform processes that are responsive to the changes in the welding arc, for example.

In some embodiments, the feeder 23 can be in a suitcase enclosure (e.g., a standard suitcase size for holding an 8- or 12-inch spool, or an even smaller suitcase size). The suitcase enclosure of the feeder 23 can house, for example, a wire spool (e.g., an 8-inch spool, a 12-inch spool, etc.), a drive motor, and a feeder mechanism. (A non-limiting example of a suitcase-style enclosure can be found, for example, in U.S. application Ser. No. 13/655,134, filed Oct. 18, 2012, now U.S. Pat. No. 9,403,234, which is hereby incorporated herein by reference in its entirety.) The feeder 23 can be a voltage sensing (VS) feeder, a slightly modified VS feeder, a remote connection (RC) feeder, a slightly modified RC feeder, or another type of feeder (e.g., the feeder 12 shown in FIG. 2).

Some embodiments contemplate that, by providing for two separate smaller modules and/or units (i.e., a portable advanced process module 22 and a feeder 23), both enclosed in a suitcase style enclosure with disconnectable power and communication means between the two units, greater mobility, lighter weight, and smaller unit size are achieved when compared with the all-in-one feeder and power source 9 shown in FIG. 1.

Some embodiments contemplate that advanced welding processes can be accomplished at a distance far away from the power supply 21 since the portable advanced process module 22, which includes the power electronics, is connected between the power supply 21 (e.g., remote power supply or source, main power supply or source, etc.) and is located in the welding work area 32.

Some embodiments of the advanced portable process module system 20 address the problem of long digital control cables between the feeder 23 and the power supply 21 by eliminating the need for a long control cable. Instead of the long digital control cables, communication technology (e.g., ArcReach communication technology), that uses power cables (e.g., welding cables and/or primary power cables) as a transmission medium for passing control signals between welding system components, is used over the positive and negative leads 24, 25 (e.g., weld cables) that provide the DC bus to the portable advanced process module 22. In some embodiments, this reduces costs for upfront purchases and improves reliability and repair costs of the system.

Some embodiments of the portable advanced process module system 20 provide for a wireless network being provided in the welding work area 32. For example, some embodiments contemplate that wireless connectivity be provided between various components of the portable advanced process modem system 20. The portable advanced process module 22 can be in wireless communication with the feeder 23, for example. In one embodiment, the portable advanced process module 22 and the feeder 23 can be in direct wireless communication. In another embodiment, the portable advanced process module 22 and the feeder 23 can be in indirect wireless communication via wireless infrastructure (e.g., an access point, a portable access point, a base station, a portable base station, a mini-base station, a wireless repeater, a portable wireless repeater, a wireless router, a portable wireless router, etc.). The wireless infrastructure can be in or around the welding work area 32. Some embodiments provide for different types of wireless communication in different types of wireless networks including, for example, Bluetooth networks, wireless local area networks (WLAN), WiFi networks, IEEE 802.11-compliant networks, ZigBee networks, ultrawideband networks, radio frequency networks, cellular networks, personal area networks (PANs), wireless mesh networks, etc. Some embodiments provide that some or all of the wireless infrastructure can be part of the portable advanced process module 22 and/or the feeder 23. Some embodiments provide that the wireless infrastructure is separate from the portable advanced process module 22 and/or the feeder 23. Some embodiments provide that the portable advanced process module 22 and/or the feeder 23 can have one or more than one antenna each for wireless communication. Some embodiments contemplate that one or more wireless links can replace one or more wired links between the portable advanced process module 22 and the feeder 23, for example. Some embodiments contemplate that one or more wireless links can provide data and/or control information between the portable advanced process module 22 and the feeder 23, for example. Some embodiments contemplate that the ArcReach communication over the weld cables (e.g., positive and/or negative leads 24, 25) can be wired, or can be wireless and bypass the weld cables to the portable advanced process module 22.

Some embodiments contemplate reducing the amount of weld cable between the advanced power electronics of the portable advanced process module 22 and the work piece 28 by locating the portable advanced process module 22 in the welding work area 32 closer to the work piece 28. Shorter cable lengths reduce the amount of inductance in the cables, thereby providing faster and more accurate welding processes, welding control processes, and/or waveforms.

Some embodiments contemplate that use of a voltage sensing (VS) clip is not required because the system 20 is powered by a DC bus supplied by the power supply 21 (e.g., a standard remote welding power source), the positive and negative cables 24, 25 are connected to the advanced power electronics of the portable advanced process module 22, and a short control cable with suitable power for the feeder 23 is used between the advanced power electronics of the portable advanced process module 22 and the feeder 23 (e.g., a suitcase feeder). VS leads on VS style feeders can be used to complete the circuit that provides power to the wire feeder from the welding arc voltage. However, when attaching a VS clip to the welding work piece on a standard VS feeder, the VS clip may spark when making the connection due to a voltage present on the work piece. In some embodiments, since the advanced power electronics of the portable advanced process module 22 provides power to the feeder 23 through a short control cable, the VS clip is not required and the risk of sparking is eliminated.

Some embodiments provide portable advanced process module system that can include, for example, a welding power source, a portable advanced process module, and a wire feeder. The portable advanced process module and the wire feeder can be separately enclosed in suitcase style enclosures with disconnectable power and communication means between the portable advanced process module and the wire feeder. The portable advanced process module can include, for example, power electronics to enable advanced weld processes that can be delivered to the wire feeder and a welding work piece. The portable advanced process module can be powered by a DC bus that can be supplied by a welding power source. Connecting the portable advanced process module between the welding power source and the wire feeder enables advanced welding processes to be accomplished at great distances from the main welding power source. Separating the power electronics into the portable advanced process module and maintaining a standard suitcase wire feeder form factor keeps the welding equipment used in the working area envelope small, light, and portable.

Some embodiments of the portable advanced process module systems enable advanced welding process capability in a standard welding system over long distances. Faster, more responsive, and more accurate welding processes ("get what you set") are possible by locating the welding power electronics of the portable advanced process module close to the welding work piece, thereby reducing cable inductance and voltage drop across long distance cables.

Some embodiments of the portable advanced process module systems improve portability of welding equipment in the welding working envelope.

Some embodiments of the portable advanced process module systems reduce costs of purchase and costs of the repair of control cables.

Some embodiments of the portable advanced process module systems enable fleet management of existing welding equipment (e.g., Miller welding equipment) because some embodiments can be used with mostly standard welding power sources and Suitcase feeders.

Some embodiments of the portable advanced process module systems enable complete "on-the-fly" adjustment of welding parameters at the work piece.

Some embodiments of the portable advanced process module systems eliminate VS cable connection and associated sparking that occurs with typical VS style feeders.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A welding system, comprising:
  a power supply;
  a portable advanced process module that includes power electronics and that is coupled to the power supply, wherein the power electronics are configured to:
    manipulate first current or voltage from an output from the power supply to generate a second current or voltage different from the first current or voltage, the second current or voltage corresponding to advance welding waveform processes; and deliver the second current or voltage to a feeder coupled to the portable advanced process module to perform a weld process employing the second current or voltage via a welding torch coupled to the feeder, wherein the portable advanced process module or the feeder are configured to be remote from the power supply, wherein the feeder is enclosed in a first housing, wherein the portable advanced process module is enclosed in a second housing, and wherein the first housing is separate from the second housing.

2. The welding system of claim 1, wherein the advanced welding processes or procedures include alternating current welding.

3. The welding system of claim 1, wherein the power supply is configured to be at least approximately 200 feet from the portable advanced process module.

4. The welding system of claim 3, wherein the portable advanced process module is configured to be within approximately 10 feet of the feeder.

5. The welding system of claim 4, wherein the welding work area has a radius that is less than approximately 75 feet.

6. The welding system of claim 1, wherein the portable advanced process module and the feeder are configured to be disposed in a welding work area, and wherein the power supply is configured to be remotely located from the welding work area.

7. The welding system of claim 1, wherein the power electronics is further configured to manipulate the first current or voltage to generate a third current or voltage different from the first or second current or voltage, the third current or voltage corresponding to another advanced welding waveform processes or procedures.

8. The welding system of claim 1, wherein the portable advanced process module is configured to be coupled to the power supply through one or more cables, and wherein the one or more cables are configured to provide communication and control to the portable advanced process module so that control of a welding process is localized in the welding work area.

9. The welding system of claim 1, wherein the first housing is part of a first suitcase-style case, or wherein the second housing is part of a second suitcase-style case.

10. A method of providing a welding system, comprising:
providing a portable advanced process module, a feeder, and a power supply as separate units;
configuring the portable advanced process module or the feeder to be remote from the power supply;
coupling the power supply and the portable advanced process module;
receiving an output from the power supply with a first current or voltage;

manipulating the first current or voltage from the output to a second current or voltage different from the first current or voltage; and delivering the second current or voltage to the feeder to perform a weld process employing the second current or voltage.

11. The method of claim 10, wherein advanced welding processes or procedures include alternating current welding.

12. The method of claim 10, wherein the power supply is configured to be at least approximately 200 feet from the portable advanced process module, and wherein the portable advanced process module is configured to be within approximately 10 feet of the feeder.

13. The method of claim 10, wherein the portable advanced process module includes power electronics that is configured to power and control the feeder and is configured to control advanced welding processes or procedures.

14. The method of claim 10, wherein the portable advanced process module is coupled to the power supply through one or more cables, and wherein the one or more cables are configured to provide communication and control to the portable advanced process module so that control of the feeder is localized in the welding work area.

15. The method of claim 10, further comprising passing digital control signals via negative and positive leads of a weld cable that connects the power supply and the portable advanced process module.

16. The method of claim 10, wherein the feeder is enclosed in a first suitcase, and wherein the portable advanced process module is enclosed in a second suitcase.

17. A portable advanced process module that includes power electronics and that is coupled to a power supply, wherein the power electronics are configured to:
receive an output from the power supply with a first current or voltage;
manipulate the first current or voltage from an output from the power supply to generate a second current or voltage different from the first current or voltage, the second current or voltage corresponding to advance welding waveform processes; and
deliver the second current or voltage to a feeder or a welding torch coupled to the portable advanced process module to perform a weld process employing the second current or voltage via a welding torch coupled to the feeder.

18. The portable advanced process module of claim 17, further comprising a work lead connecting the portable advanced process module to a work piece, and a weld lead connecting the portable advanced process module to the feeder.

19. The portable advanced process module of claim 17, wherein the portable advanced process module or the feeder are configured to be remote from the power supply.

* * * * *